(12) United States Patent
Frank et al.

(10) Patent No.: US 10,819,177 B2
(45) Date of Patent: Oct. 27, 2020

(54) HELICAL WINDING WITH MORE UNIFORM FIELD UTILIZATION

(71) Applicant: Siemens Aktiengesellschaft, Munich (DE)

(72) Inventors: Michael Frank, Uttenreuth (DE); Jörn Grundmann, Großenseebach (DE); Wolfgang Nick, Nuremberg (DE); Mercedes Herranz Gracia, Forchheim (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 61 days.

(21) Appl. No.: 16/340,898

(22) PCT Filed: Oct. 9, 2017

(86) PCT No.: PCT/EP2017/075591
§ 371 (c)(1),
(2) Date: Apr. 10, 2019

(87) PCT Pub. No.: WO2018/069203
PCT Pub. Date: Apr. 19, 2018

(65) Prior Publication Data
US 2019/0238020 A1 Aug. 1, 2019

(30) Foreign Application Priority Data
Oct. 14, 2016 (DE) .......................... 10 2016 220 040

(51) Int. Cl.
*H02K 3/28* (2006.01)
*H02K 3/47* (2006.01)
(Continued)

(52) U.S. Cl.
CPC ................. *H02K 3/28* (2013.01); *H02K 3/47* (2013.01); *H02K 11/33* (2016.01); *H02K 55/00* (2013.01);
(Continued)

(58) Field of Classification Search
CPC . H02K 3/28; H02K 11/33; H02K 3/47; H02K 55/04; H02K 55/00
(Continued)

(56) References Cited

U.S. PATENT DOCUMENTS 3,761,752 A    9/1973   Anderson ...................... 310/179
4,481,438 A    11/1984   Keim ............................ 310/201
(Continued)

FOREIGN PATENT DOCUMENTS

DE   10 2006 052 457 A1   5/2008 ............. H02K 16/00
GB   1395 152 A   5/1975 ............... H02K 3/00
(Continued)

OTHER PUBLICATIONS

Kirtley, James L., "Air-Core Armature Shape: A Comparison of Helical and Straight-With-End-Turns Windings," Electric Power Components and Systems (formerly: Electric Machines and Power Systems), vol. 23, Issue 3, pp. 263-278, 1995.
(Continued)

*Primary Examiner* — Naishadh N Desai
(74) *Attorney, Agent, or Firm* — Slayden Grubert Beard PLLC (57) ABSTRACT

Various embodiments include a stator for an AC electric machine with a number of magnetic poles comprising: a central axis; and a stator winding with a plurality of conductor turns. The individual conductor turns are grouped into a total of n electrical strands. The individual conductor turns of a respective electrical strand define a first conductor branch and a second conductor branch. The first conductor
(Continued)

branch and the second conductor branch are arranged helically around the central axis over at least half of their respective lengths. The helically arranged conductor branches each have a pitch greater than a product of an axial length of the helical conductor branches and the number of magnetic poles.

14 Claims, 7 Drawing Sheets

(51) Int. Cl.
      *H02K 55/00*          (2006.01)
      *H02K 11/33*          (2016.01)
      *H02K 55/04*          (2006.01)
      *B64D 27/24*          (2006.01)

(52) U.S. Cl.
    CPC ............. *H02K 55/04* (2013.01); *B64D 27/24* (2013.01); *H02K 2213/03* (2013.01); *Y02E 40/62* (2013.01)

(58) Field of Classification Search
    USPC .................................................. 310/179–210
    See application file for complete search history.

(56) References Cited

U.S. PATENT DOCUMENTS

| | | | | |
|---|---|---|---|---|
| 2002/0092152 | A1* | 7/2002 | Asao | H02K 3/12 |
| | | | | 29/596 |
| 2004/0207283 | A1* | 10/2004 | Oohashi | H02K 15/0485 |
| | | | | 310/207 |
| 2015/0229174 | A1* | 8/2015 | Tokizawa | H02K 3/12 |
| | | | | 310/208 |
| 2018/0076678 | A1 | 3/2018 | Dehez et al. | |

FOREIGN PATENT DOCUMENTS

| | | | |
|---|---|---|---|
| JP | S57-46641 A | 3/1982 | ............. H02K 23/58 |
| JP | S60-170448 A | 9/1985 | ............. H02K 15/04 |
| WO | 2016/110549 A1 | 7/2016 | ............. H02K 3/26 |
| WO | 2018/069203 A1 | 4/2018 | ............. H02K 3/04 |

OTHER PUBLICATIONS

German Office Action, Application No. 10 2016 220 040.2, 14 pages, dated Jul. 7, 2017.
International Search Report and Written Opinion, Application No. PCT/EP2017/075591, 19 pages, dated Jan. 24, 2018.

* cited by examiner

HELICAL WINDING WITH MORE UNIFORM FIELD UTILIZATION

CROSS-REFERENCE TO RELATED APPLICATIONS

This application is a U.S. National Stage Application of International Application No. PCT/EP2017/075591 filed Oct. 9, 2017, which designates the United States of America, and claims priority to DE Application No. 10 2016 220 040.2 filed Oct. 14, 2016, the contents of which are hereby incorporated by reference in their entirety.

TECHNICAL FIELD

The present disclosure relates to electric machines. Various embodiments may include a stator for an AC electric machine with a number p of magnetic poles, wherein the stator has a stator winding with a plurality of conductor turns, at least a portion of each of which runs helically.

BACKGROUND

Stator windings are known in which the conductor turns are arranged helically with respect to a central axis of the stator. Such windings are referred to as helical windings or as diagonal windings. The use of a winding of this type is especially advantageous for achieving a particularly high power density in an electric machine, as required for example for use in vehicle drive units. Especially in aircraft applications, achieving a high power density is a primary design goal. Of particular advantage with regard to a high power density is the use of a helical stator winding in conjunction with a superconductive rotor. A machine constructed in this way is for example described in "Air-core armature shape: A comparison of helical and straight-with-end-turns windings" by James L. Kirtley, Electric Machines and Power Systems, 23:263-278, 1995.

The stator windings of conventional electric machines are mostly assembled as straight windings, in which the conductor branches for the electrical induction run parallel to the central axis of the machine. These straight portions are then connected in their axial end regions by what are called winding heads, whereby the straight portions of the individual turns are bridged in the peripheral direction by the winding heads. A drawback of a conventional geometry such as this is that the weight of these winding heads contributes substantially to the total weight of the stator and also that they are difficult to cool and difficult to produce. The winding heads also require considerable space, thereby increasing the structural volume of the electric machine overall. To produce a machine with a high power density, it is therefore generally advantageous for the winding heads to be made as small as possible or, ideally, for them to be omitted entirely.

This is achieved through the use of a helical winding, such as described in the publication cited above, for example. The stator winding described there has two winding layers, one located radially within the another, whereby the direction of winding of the helical turns differs between the inner and outer winding layers. By connecting the individual inner and outer conductor portions, superordinate, interconnected conductor loops are obtained, in which electrical induction can take place.

Conventional winding heads may be omitted entirely if, as described in the publication, the upper and lower conductor portions to be connected always meet each other in the axial end regions at the same peripheral positions. Then, only the radial distance between the upper layer and the lower layer is bridged by the connecting parts provided in the end regions. The connecting parts may therefore be designed to be extremely short and hence space- and weight-saving. A conventional winding head with a sizeable dimension in the peripheral direction is not required. The described stator winding is divided into three separate strands, whereby each strand is assigned to one phase, such that the electric machine can be run with conventional three-phase AC current.

However, a drawback of the described helical stator winding is that the field utilization is not as good as the field utilization of a conventional electric machine with a straight, substantially axially running stator winding. Especially in the axial end regions, the field utilization of a conventional helical stator winding is particularly low.

SUMMARY

The present disclosure describes stators with a helical winding that overcomes the stated drawbacks. In particular, some embodiments include a stator wherein the field utilization is more uniform and/or higher in comparison with known helical windings. For example, some embodiments include a stator (3) for an AC electric machine (1) with a number p of magnetic poles, wherein the stator (3) has a central axis A; wherein the stator (3) has a stator winding (4) with a plurality of conductor turns (13$j$); wherein the individual conductor turns (13$j$) are grouped into a total of n electrical strands (u,v,w); wherein the conductor turns (13$j$) of a strand each have at least a first conductor branch (23$a$) and a second conductor branch (23$b$); wherein these conductor branches (23$a$, 23$b$) are arranged helically around the central axis (A) over the greatest part (1) of their length; and wherein these helically arranged conductor branches (23$a$, 23$b$) each have a pitch h that is greater than the product of the axial length 1 of the helical conductor branches (13$j$) and of the pole number p.

In some embodiments, the stator winding (4) has electrically conductive connecting conductors (19) in the axial end regions (17) between first conductor branches (23$a$) and second conductor branches (23$b$); and these connecting conductors (19) have both a radial direction component and a direction component in the peripheral direction.

In some embodiments, the electrically conductive connecting conductors (19) are arranged such that, for each strand (u, v, w), there is at least one superordinate coil arrangement (21).

In some embodiments, the stator winding (4) has a number i of conductor turns (13$j$), where i corresponds either to the product of the pole number p and of the strand number n or to half of the product of the pole number p and of the strand number n.

In some embodiments, each of the i conductor turns has a first conductor branch (23$a$) and a second conductor branch (23$b$); and the pitch h is chosen such that the respective conductor branches (23$a$, 23$b$) are wound helically over their axial length l with an angle $\alpha$, where the value of a is such that it is at least $\alpha=360°/p-2*360°/i$ and smaller than $\alpha=360°/p$.

In some embodiments, the first conductor branches (23$a$) of the individual conductor turns (13$j$) are arranged on a common inner cylinder surface (20$a$); and the second conductor branches (23$b$) of the individual conductor turns (13$j$) are arranged on a common outer cylinder surface (20$b$).

In some embodiments, the stator winding (4) is arranged such that the first conductor branches (23a) on the inner cylinder surface (20a) have a common first winding direction; and the second conductor branches (23b) on the outer cylinder surface (20b) have a common second winding direction, which is opposite the first winding direction.

In some embodiments, the number n of strands (u1, u2, u3, v1, v2, v3, w1, w2, w3) is greater than three, in particular an integer multiple of three.

In some embodiments, the stator winding (4) is executed as an air gap winding.

As another example, some embodiments include an electric machine (1) with a stator (3) as described herein.

In some embodiments, there is a rotor (7) that is designed to generate a magnetic field with p poles.

In some embodiments, the rotor (7) is provided with at least one superconductive excitation winding (8).

In some embodiments, there is at least one inverter for creating and/or removing a phase shift between the currents flowing in the individual strands of the stator winding (4).

In some embodiments, the number p of magnetic poles is between 2 and 12, in particular 8.

In some embodiments, the electric machine is arranged as a generator or as a drive motor for an aircraft.

BRIEF DESCRIPTION OF THE DRAWINGS

The teachings herein are described below on the basis of some exemplary embodiments with reference to the appended drawings, in which.

DETAILED DESCRIPTION

In some embodiments, a stator is designed for an AC electric machine with a number p of magnetic poles and has a central axis A. The stator has a stator winding with a plurality of conductor turns that are grouped into a total of n electrical strands, whereby the conductor turns of a strand each have at least a first conductor branch and a second conductor branch. These conductor branches are arranged helically around the central axis A over the greatest part of their length. These helical conductor branches each have a pitch h that is greater than the product of the axial length l of the helical conductor branches and of the pole number p. In some embodiments, the stator is thus designed for the induction of voltages in a magnetic field with p poles. To this end, the arrangement of the stator windings may exhibit in particular a substantially p/2-fold rotational symmetry with respect to a central axis of the stator.

The helical conductor branches run diagonally with respect to the central axis of the stator. Thus, in other words, it is a helical winding, also referred to as a diagonal winding. The individual turns are located in particular on one or more common cylinder surfaces, the cylinder axis of which in turn is the central axis of the stator. The various conductor branches may be distributed over multiple cylinder surfaces nested within one another. The conductor turns thus exhibit in particular no radial component in the helical portions. The individual strands are arranged such that each strand is assigned to one electrical phase. In other words, an AC current that is phase-shifted with respect to the other strands can flow in the conductor turns assigned thereto.

In some embodiments, the conductor turns run helically over the greatest part of their length. In particular, this may be an axial portion of the stator that is common to all of the turns. In particular, this may be an axially internally located portion. Thus, the run of the conductor turns taking a shape other than a helical shape in certain segments, especially the axial end regions, should not be excluded. In the helically shaped longitudinal portion of the stator winding, individual conductor branches of the respective strands may be arranged next to one another, i.e. offset by a certain angle in the peripheral direction, on a common cylinder surface. They may in particular be distributed regularly over this cylinder surface, resulting in a multistranded helix. The first and second conductor branches of a given conductor turn may in particular each exhibit a different axial direction component of the current flow. In this way, one conductor turn of a coil with annular current flow can be formed from two or more such conductor branches.

In the present context, said pitch of a helix should be understood, according to the usual geometric definition, as the axial length that is required for one complete turn of the helix. Said axial length l is the effective length of the helical stator winding, i.e. the length of the region of the winding in which the conductor branches are arranged helically. In a winding that runs substantially completely helically, l is thus, in other words, the axial length of the winding minus the length of the end regions, which are required for connecting the conductor branches.

In some embodiments, the pitch is greater than the product of the axial length l and of the pole number p. If the pitch h corresponds exactly to the product l*p, then the stator winding could be arranged such that the conductor branches to be connected to one another would meet each other exactly in the peripheral direction. In such a case, no gaps would have to be bridged in the peripheral direction. This design without offset in the peripheral direction was therefore implemented in conventional spiral windings. If the pitch is greater than the product of the axial length l and of the pole number p, then it is generally true that the electrical helix angle γ is smaller than 180°, which will become clear in conjunction with the exemplary embodiments further below.

However, in some embodiments, the pitch is greater than the product l*p. Here, the tilt of the individual conductor branches with respect to the central axis A is thus smaller than in the conventional design, and the connecting conductors provided for connecting the individual helical conductor branches may then be suitably arranged such that they are able to bridge a gap in the peripheral direction between the conductor branches to be connected. In this case, the connecting parts may thus exhibit both a radial component and a component in the peripheral direction.

In some embodiments, the advantage of a decreased tilt of the conductor branches and of an offset between the conductor ends to be connected is that the field utilization of the stator winding may be increased by this measure. In particular, the field utilization in the axial end regions of the stator winding is increased, since the area between the outgoing and incoming conductors (i.e. the first and second conductor branches) of a given stator turn is larger in the end regions. Due to the decreased tilt, a field utilization is thus achieved in the end regions that does not drop to zero and that is overall closer to the field utilization of a straight stator winding. The fundamental advantages of helical windings are also afforded along with the above, i.e. in particular the omission of expensive and difficult to cool winding heads and the associated increase in power density.

In some embodiments, an electric machine includes a stator as described above. Such a machine may also possess a rotor for generating a rotating magnetic field. The described embodiments of the stator and of the electric machine may here be combined with one another.

In some embodiments, the stator winding has electrically conductive connecting conductors in the axial end regions between the first conductor branches and the second conductor branches. These connecting conductors exhibit in particular both a radial direction component and a direction component in the peripheral direction. By virtue of the connecting conductors, the offset between the helical conductor branches present in the peripheral direction can thus be bridged, and, by electrically connecting the conductor branches, a stator winding with at least one and preferably multiple looped conductor turns may be produced.

In some embodiments, the offset in the peripheral direction between the conductor branches to be connected to one another is so large that a geometrical angular offset of at least 1°, in particular at least 3°, must be bridged in the axial end regions. In the case of such a large offset, the field utilization can be effectively increased, in particular in the axial end regions. Each conductor turn can have an outgoing conductor (the first conductor branch) and an incoming conductor (the second conductor branch) based on the direction of the central axis. These two conductor branches can be arranged around the central axis, in particular with different winding directions. In particular, all first conductor branches of the individual turns can have the same winding direction as one another, and all second conductor branches of the individual turns can accordingly have the same winding direction as one another, which is opposite that of the first conductor branches. The stator winding as a whole can then be composed of a concatenation of the helical first and second conductor branches over the entire periphery of the stator. Since the conductor branches are helical over the greatest part of their axial length, it is a helical winding overall. The helical conductor branches may in turn be connected in their axial end regions by means of connecting conductors which do not run in a helical manner.

In some embodiments, the electrically conductive connecting conductors may comprise either separate connecting parts or conductor portions arranged in one piece with the conductor branches. In such a one-piece arrangement, the connecting conductors are therefore only conductor portions of a winding wound from a continuous conductor and are not connecting parts subsequently introduced between the conductor branches.

In some embodiments, the electrical connecting conductors may be arranged such that, for each strand, there is at least one superordinate coil arrangement. In this case, the connecting conductors can be used to connect conductor branches of the same coil turns and/or of adjacent coil windings, which are therefore connected to form a superordinate coil arrangement for each strand. In particular, in the case of the described distribution of the first and second conductor branches to inner and outer surfaces, an inner, first conductor branch can be connected to an outer, second conductor branch for each connecting conductor.

Irrespective of the exact positioning of the individual conductor branches, the connecting conductors mean that an interconnected, superordinate coil arrangement is formed for each strand, which coil arrangement can extend, in particular in the form of a loop, over the entire periphery of the stator and can be used there to induce voltages and/or to form magnetic fields. Such an interconnected coil arrangement comprises at least a first conductor branch and a second conductor branch for each strand (that is to say each phase). In the case of more than two poles, the coil arrangement can accordingly comprise more pairs of conductor branches which are connected to one another, that is to say, for example, p conductor branches for each strand (or an integer multiple of p conductor branches) in the case of a p-pole machine.

In some embodiments, the stator winding may have a number i of conductor turns, where i corresponds at least to half of the product of the pole number p and of the phase number n. If each conductor turn has an outgoing conductor and an incoming conductor, the number of conductor branches then corresponds to a total of 2i and therefore at least p*n. For each of the n strands, the result is then, in particular, an interconnected loop of i=p/2 individual outgoing conductors and i=p/2 individual incoming conductors which extends overall in a helical zig-zag pattern over the periphery of the stator. These individual zig-zag loops of the respective strands can then be arranged beside one another in the peripheral direction on the surfaces of the stator. These may be, in particular, two surfaces which are located radially inside one another, as explained in yet more detail further below. With single zoning, there are expediently precisely i=n*p/2 outgoing conductors and i=n*p/2 incoming conductors. In contrast, with double zoning, there are i=n*p outgoing conductors and i=n*p incoming conductors.

In the present disclosure, the term "double zoning" should be understood as meaning the fact that the zone width is twice as large as in "single zoning". In this case, the zone width represents that part of the periphery which is occupied by the coil sides (that is to say the conductor branches here) of a strand in the region of an electrical pole pair. In the case of "single zoning", the conductor branches of the respective strands are therefore only half as wide as in "double zoning".

Said conductor turns and conductor branches are not restricted to individual conductors. Each conductor turn and each conductor branch can optionally be composed of a plurality of conductor elements. These conductor elements can be guided substantially parallel to one another in bundles. Individual conductor elements can also be stranded with one another or transposed in the manner of a Roebel conductor. In this case, it is also possible for a plurality of stranded and/or transposed conductor elements to be guided beside one another within a conductor branch as a parallel bundle. In particular, they can lie beside one another in the peripheral direction and/or can be stacked in the radial direction. These conductor elements can be electrically connected either in series or in parallel.

In some embodiments, the number i of conductor turns is intended to correspond at least to the product of p/2 and n. In this case, i corresponds either exactly to the product of p/2 and n or corresponds to an integer multiple of this product.

A stator winding with p/2-fold rotational symmetry and n separate strands can be formed in a particularly simple manner.

In some embodiments, the stator winding includes a number i of first conductor branches and an identical number i of second conductor branches, where i corresponds either to the product of the pole number p and of the strand number n (in the case of single zoning) or to half of said product (in the case of double zoning). In this case, the pitch h of the helical conductor branches is chosen such that the respective conductor branches are wound helically over their axial length l with an angle $\alpha$, where the value of a is such that it is $\alpha=360°/p-2*360°/i$ and is smaller than $\alpha=360°/p$.

In some embodiments, $\alpha$ is at least $360°/p-2*360°/i$ so that the gap to be bridged by the connecting conductors is not excessively large and the advantage described at the outset of the small amount of space required for the connecting conductors in comparison with conventional winding heads is nevertheless still achieved. In some embodiments, the angle $\alpha$ can be in the range of approximately $360°/p-360°/i$. In other words, in comparison with the configuration without an offset in the peripheral direction, it is selected such that an offset of approximately one strand zone between those ends of the conductor branches which are to be connected results in each of the end regions. In contrast, for the stated minimum value of the angle of $360°/p-2*360°/i$, an offset of two strand zone divisions results at each axial end of the conductor branches to be connected.

The term "strand zone division" is used here for the angular offset of $360°/i$. It should be understood in a similar manner to the term "slot pitch" which is conventional among experts and results from the fact that the i conductor branches can be arranged in slots in a stator carrier on each cylinder jacket. A slot pitch of $360°/i$ is then accordingly the angular offset between two such slots which are adjacent in the peripheral direction. For the stated value of the angle of $360°/p-360°/i$, only a corresponding strand zone division at each axial end must be bridged by the connecting conductors, and the formation of an excessively voluminous winding head may be avoided.

In some embodiments, the first conductor branches of the individual conductor turns can be arranged on a common inner cylinder surface, on the one hand, and the second conductor branches of the individual conductor turns can be arranged on a common outer cylinder surface, on the other hand. In this case, the first conductor branches on the inner cylinder surface may have, in particular, a common first winding direction, and the second conductor branches on the outer cylinder surface may have a common winding direction, which is opposite that of the first conductor branches.

In some embodiments having two cylinder surfaces which are nested within one another, the helical winding can thus be designed to be particularly space-saving. The division into inner and outer cylinder surfaces according to the axial direction and the winding direction makes it possible to avoid crossings of conductor branches in the axially inner region within the respective cylinder surface. The associated conductor branches have the same winding direction on each of the two surfaces. They likewise expediently have the same pitch and can therefore be arranged beside one another on the same surface without crossing over. Adjacent conductor branches have only an angular offset, that is to say an offset in the peripheral direction of the stator.

The number n of strands of the stator winding can be three, in particular. This corresponds to a typical number of strands for a conventional three-phase AC winding. However, in some embodiments, the number n of strands is greater than three. In particular, it may be an integer multiple of three. In some embodiments, the number of strands which is increased in comparison with the conventional three-phase winding makes it possible to improve the field utilization and to reduce the harmonic fields.

Calculations show that the field utilization is increased by increasing the number of phases, in particular in the axially inner region. In other words, the field utilization may be improved in the region of its maximum. In this manner, a helical winding can be used in the axially inner region to achieve a field utilization which is close to the field utilization of a straight winding. The increase in the field utilization can be attributed, in particular, to the fact that, if more than three strands are present, the rotating field in the air gap is formed by a polygon having accordingly more corners and therefore more closely approximates the ideal circular form. In the case of a winding having three strands which each comprise outgoing and incoming conductors, the rotating field is built up by a hexagon, for example. If the number of strands is increased in this manner, a polygon having more than these six phasors is produced (for example a multiple thereof). The greater the number of corners, the more closely the resulting polygon approximates the ideal circle.

In some embodiments, the strand number n may have values of 6, 9 or 12. Such small integer multiples of three are particularly favorable since this can be used to achieve a symmetrical structure in which each of the three phases of a conventional three-phase AC machine is split into a plurality of partial phases which are phase-shifted with respect to one another. The entire field utilization of the stator winding—that is to say the field utilization averaged over the axial length l of the stator winding—can therefore be increased, by combining the two features mentioned: on the one hand, a slight offset of the conductor elements in the peripheral direction improves the field utilization in the axial end regions.

On the other hand, the increase in the strand number to a value of greater than three may improve the field utilization in the axially inner region. The field utilization of a helical winding can therefore be increased in comparison with the prior art by combining the two measures, or else by means of each of the two measures per se. In this case, it should be stressed that each of the two measures also acts alone. In some embodiments, the strand number may be increased to a value n of greater than three in the case of a helical stator winding without an angular offset between the conductor branches to be connected, with the result that the field utilization is increased in the axially inner region.

Generally speaking and irrespective of the exact embodiment of the helical stator winding, the latter can be preferably executed as an air gap winding. In other words, the stator winding is not embedded in slots in an iron core or another soft-magnetic material, but rather is arranged in the air gap region of the machine. In this embodiment, the stator winding can also be arranged in the slots in a carrier structure. However, the important factor is that there is no soft-magnetic material between these slots. This embodiment as an air gap winding is particularly advantageous in an electric machine having a superconductive rotor since the magnetic fields are then so strong that excessive saturation of the soft-magnetic stator material would result in the case of a conventional machine.

The electric machine may have a rotor designed to generate a magnetic field with p poles. The described advantages of the stator are afforded, in particular, in interaction with such a rotor. In particular, such a rotor may be provided with a superconductive excitation winding. Such an embodiment may achieve a very high power density. This is relevant, in particular, to generators or motors in vehicles which must be concomitantly moved when driving such a vehicle. The power density is very particularly critical in electric machines in aircraft. Irrespective of the exact use of the machine, it may generally be operated as a motor and/or as a generator. In some embodiments, the machine may be designed as a synchronous machine.

The electric machine may have at least one inverter for creating and/or removing a phase shift between the currents flowing in the individual strands of the stator winding and/or also for setting an optimum phase shift between the stator field and the rotor field. Such inverters can be used to convert, for example, the higher-phase AC current generated by a generator configured in this manner into conventional three-phase AC current or else DC current. Conversely, such inverters can also be used to convert conventional three-phase AC current or DC current from another current source into higher-phase AC current for a motor according to the invention. In some embodiments, a generator may have more than three strands to be used as a current source for the higher-phase AC current and to feed the latter into a corresponding higher-phase motor as a load without an interposed phase shift, for example. In some embodiments, there is a plurality of DC-isolated three-phase systems fed by a generator.

Irrespective of whether inverters are used or whether the higher-phase AC current is used directly, the strand number may be a small integer multiple of three, that is to say if, for example, six-phase, nine-phase or twelve-phase AC current is generated or consumed. If n strands are present, the phase shift between individual adjacent strands can preferably be either 360°/n or 360°/2n. In some embodiments, the strand number n may be a multiple of three and for the n strands to be divided into three superordinate groups. The phase shift between the middle phases of the respective groups can then be 120° and the phase shift within the respective group can be either 360°/n or 360°/2n, for example. In this case, a phase shift of 360°/n is particularly preferred in the case of double zoning, and a phase shift of 360°/2n is particularly preferred in the case of single zoning. In these preferred embodiments, the phase shifts of all adjacent conductor branches are evenly distributed overall, and the spatial and temporal phase shifts correspond for the respective strands. Such an even distribution and correspondence are particularly favorable for achieving a high field utilization.

The number p of magnetic poles of the electric machine may be between 2 and 12, in particular between 6 and 12 or exactly 8. Such an embodiment may achieve a high power density. The range, on the one hand, decreases the radial air gap field and therefore the induced voltage with an increasing number of poles but, on the other hand, the electrical frequency increases with an increasing number of poles for the same rotational speed. The second effect increases the induced voltage, thus resulting overall in an optimum for the power within said ranges in the case of typical geometries. In addition, there are yet further effects, for example the fact that a larger yoke thickness must be selected for small numbers of poles, which in turn influences the weight. Such factors likewise determine the preferred pole number range for an optimum power density.

Figure 1:
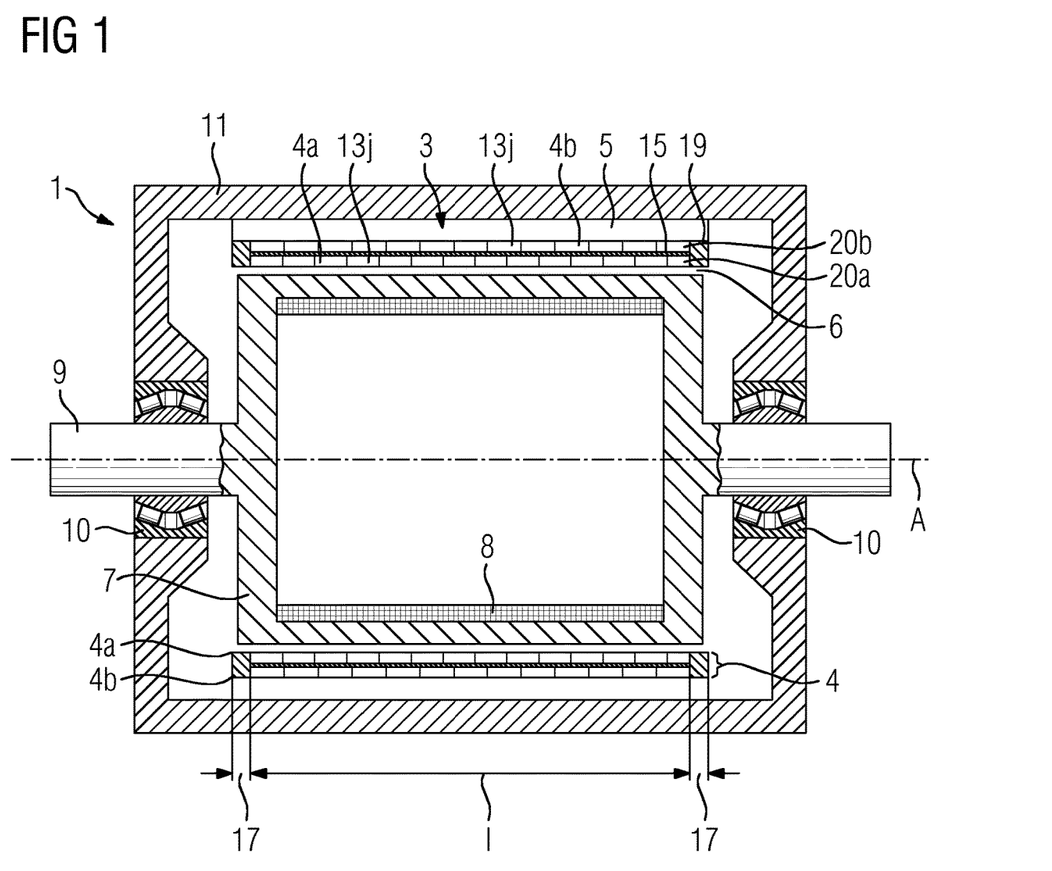
FIG. 1 shows a schematic longitudinal section of an electric machine incorporating teachings of the present disclosure.

FIG. 1 shows a schematic longitudinal section of an electric machine 1 incorporating teachings of the present disclosure. The electric machine 1 comprises a rotor 7 and a stator 3. The rotor 7 is rotatably mounted about an axis of rotation A by means of a rotor shaft 9. For this purpose, the rotor shaft 9 is supported with respect to the machine housing 11 via the bearings 10. The figure shows a longitudinal section along the axis of rotation A which is simultaneously the central machine axis. The electric machine may fundamentally be a motor or a generator or else a machine which can be operated in both modes.

The stator 3 has a stator winding 4 with a plurality of conductor turns 13j. These conductor turns 13j are helical in the axially inner section l of the stator 3—which here makes up the main part of the axial length. The individual conductor turns 13j therefore run diagonally with respect to the main axis and are each arranged around this axis A on a cylinder surface. Overall, the conductor branches of the individual conductor turns 13j are distributed to two such cylinder surfaces, namely a lower layer 4a in the region of an inner cylinder surface 20a and an upper layer 4b in the region of an outer cylinder surface 20b, wherein these two layers are nested inside one another and are arranged concentrically around the central axis A. The conductor branches of the lower layer 4a and of the upper layer 4b have an opposite direction of winding, which becomes even clearer in connection with FIGS. 2 to 4. Conductor branches of the upper layer 4b and of the lower layer 4a which are associated with one another are connected to one another in an electrically conductive manner in the axial end regions 17 of the stator winding 4 by means of connecting conductors 19. These connecting conductors 19 bridge both the radial distance between the upper layer 4b and the lower layer 4a and the angular offset (not apparent in the present sectional image) in the peripheral direction between the individual conductor tracks of the upper layer 4b and of the lower layer 4a which are to be connected. In the axially inner region 1, the upper layer 4b and the lower layer 4a are electrically insulated with respect to one another by means of layer insulation 15. In some embodiments, however, such insulation of the two conductor layers can also be achieved by means of an insulating sheath of each individual conductor branch.

Those regions of the stator winding 4 which are axially further inside in the section l, in particular, interact with a field of the rotor in an electromagnetic manner during operation of the electric machine 1. This interaction takes place over an air gap 6 which is radially between the rotor 7 and the stator 3. In the example shown, the stator winding 4 is carried by an amagnetic stator carrier 5; this is therefore an air gap winding without iron teeth between the turns of the winding. In the present example, the electromagnetic interaction is also not equal to zero in the axial end regions as a result of the described angular offset in the peripheral direction between the conductor branches connected to one another in these end regions. Rather, a field utilization which differs from zero is also present in the end regions as a result of the inventive arrangement of the stator with corresponding "spreading" of the conductor branches which are connected to one another.

The electric machine in FIG. 1 has a superconductive field winding 8 in the rotor 7. In this respect, the rotor 7 can be cooled during operation to a cryogenic temperature which is below the transition temperature of the superconductor used. This operating temperature can be in the range of approximately 20 K to 77 K, for example. The cooling can be achieved using a cooling system which is not illustrated in any more detail in the figure. The cryogenic components should also be thermally insulated with respect to the warm environment.

The exact arrangement of the stator winding in the example from FIG. 1 is intended to be explained in more detail on the basis of the following figures. In this respect, a stator winding which has a similar structure but is not according to the invention is first of all described on the basis of FIGS. 2 and 3, which stator winding, in contrast to the example from FIG. 1, does not have an angular offset in the peripheral direction between the conductor branches to be connected to one another.

Figure 2:
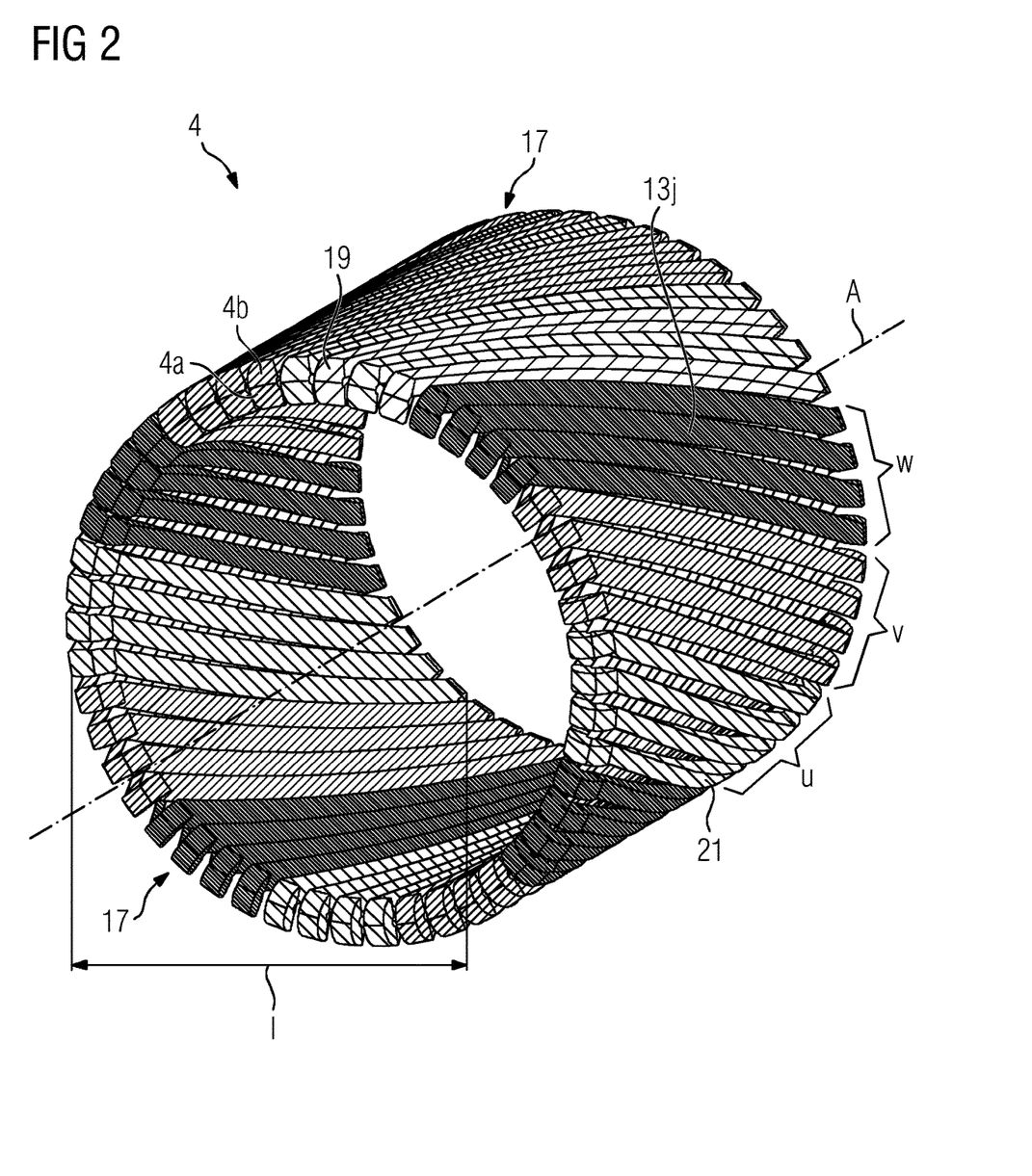
FIG. 2 shows a schematic perspective view of a stator winding according to the prior art.

FIG. 2 shows a schematic perspective view of a corresponding stator winding 4 without an azimuthal offset in the axial end regions. This stator winding 4 is in the form of a helical winding in which the individual conductor turns 13$j$ are arranged helically around the central axis A within the axially inner region 1. The stator winding 4 in the example shown is subdivided into three strands u, v and w. These strands correspond to individual phases of the three-phase AC current which can be either generated using the electric machine or can be converted into mechanical energy. Each strand has four coil arrangements which are beside one another in the peripheral direction and are each composed of a multiplicity of conductor branches connected to form a conductor loop. These conductor branches are divided into a group of first conductor branches which are arranged on the lower layer 4$a$ of the coil winding and into a group of second conductor branches which are arranged on the upper layer 4$b$ of the coil winding.

The conductor branches of the lower layer 4$a$ therefore all lie on an inner cylinder surface and the conductor branches of the upper layer all lie on an outer cylinder surface. Within each of the two layers 4$a$ and 4$b$, the conductor branches all have the same tilt and the same direction of winding, with the result that crossovers of conductor branches are avoided within the individual layers. In the axial region 1, the individual conductors are electrically insulated with respect to one another and the upper and lower layers are not connected to one another. The electrical connections which join the conductor branches together to form a superordinate coil arrangement are fitted in the axial end regions 17. Connecting conductors 19 for connecting the upper and lower layers are arranged here. In the example shown in FIG. 4 (in contrast to the examples according to the invention which are described later), the tilt of the individual conductor branches is selected in such a manner that the associated conductor branches of a strand meet each other in the end regions 17 precisely at the same peripheral position. Therefore, only the radial distance between the upper and lower layers must be bridged here by the connecting conductors 19. The connecting conductor accordingly does not bridge a distance in the peripheral direction.

Figure 3:
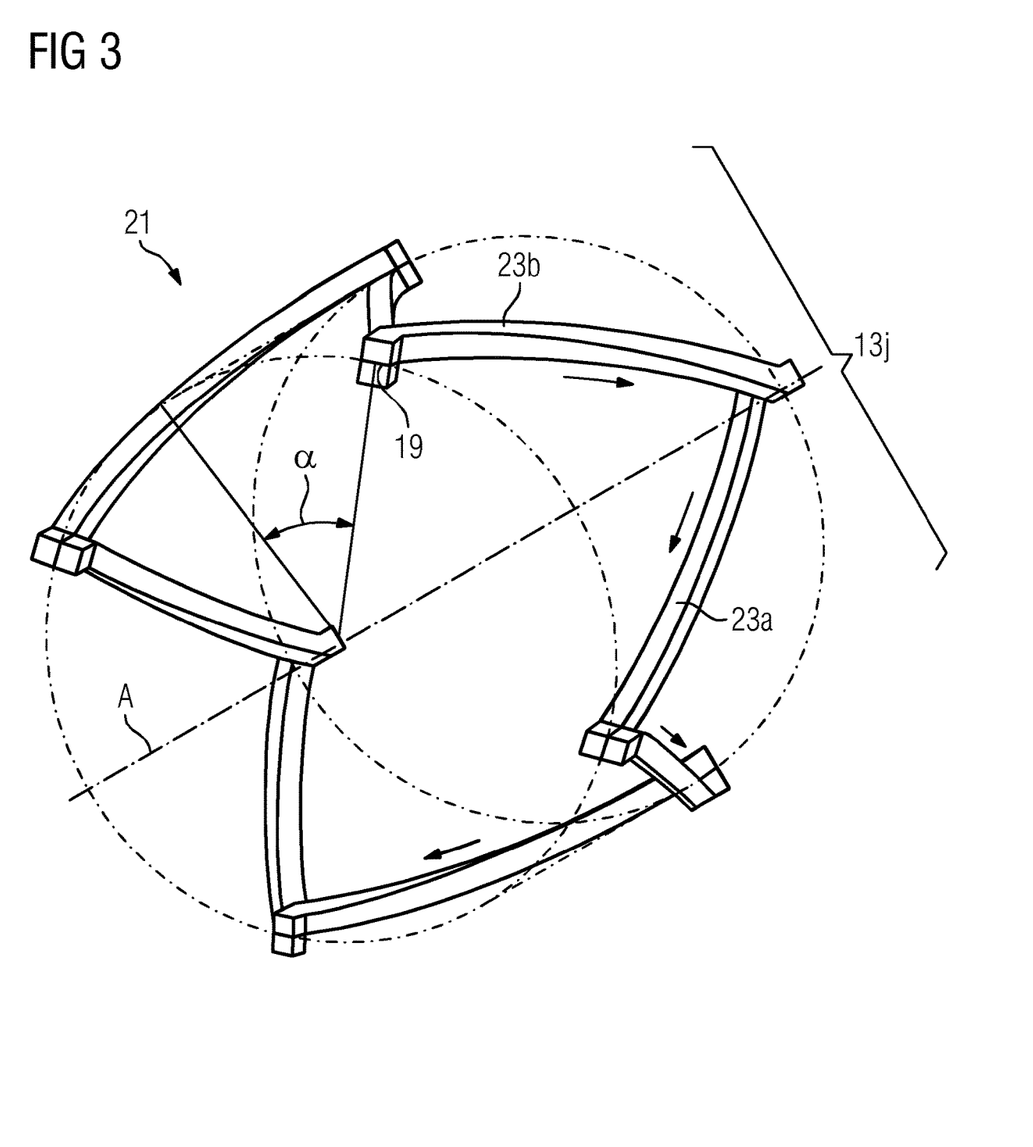
FIG. 3 shows a coil arrangement of a selected strand u1 from the stator winding in FIG. 2.

FIG. 3 shows, by way of example, the run of the individual conductor branches of a selected coil arrangement 21 of the strand u. This is therefore one of the four coil arrangements of this strand u which are guided in a parallel manner beside one another. For better clarity, the cylinder surface, which runs precisely between the upper layer 4$b$ and the lower layer 4$a$ of the winding, is also depicted. The selected coil arrangement 21 of the strand u has four individual turns 13$j$, wherein each of these turns has two conductor branches: a first conductor branch 23$a$ which, as an outgoing conductor, conducts the current with a first axial direction component and a second conductor branch 23$b$ which, as an incoming conductor, conducts the current with an opposite second axial direction component in the case of the same subordinate current direction.

These direction components are indicated, by way of example, for a predefined superordinate current direction at a given time by the arrows in FIG. 3. The four first conductor branches 23$a$ are accordingly arranged together on the cylinder surface of the lower layer 4$a$, and the four second conductor branches 23$b$ are arranged together on the cylinder surface of the upper layer 4$b$. These eight conductor branches 23$a$ and 23$b$ are connected, via the connecting conductors 19 provided in the axial end regions 17, to form the interconnected zig-zag-shaped coil arrangement 21. The other coil arrangements of the strands u, v and w have a similar structure and are arranged on the same cylinder surfaces. They are only each accordingly offset in the peripheral direction, as can be seen in FIG. 2. The shown division of such a coil arrangement 21 into four outgoing conductors and four incoming conductors corresponds to the design of the stator winding for use in an eight-pole electric machine, in other words a machine whose rotor is designed to form an eight-pole rotating magnetic field. For general pole numbers p, the number i of conductor turns 13$j$ advantageously corresponds in such a strand to half the number of magnetic poles or an integer multiple thereof. The total number i of conductor turns 13$j$ (and therefore both the number of respective outgoing conductors 23$a$ and the number of respective incoming conductors 23$b$) in a stator having n strands therefore corresponds to at least n*p/2.

In FIG. 3, the pitch h of the helical conductor sections is selected in such a manner that it corresponds exactly to the product of the axial length l of the helical conductor sections and of the pole number p. Since the pitch h is defined as the axial length for one complete turn of the helix, precisely the angular range of a magnetic pole is thus passed through on the given length l. This angular range of 360°/p is also referred to as the "pole pitch". In the example shown, the pitch is therefore selected in such a manner that the individual conductor branches 23$a$ and 23$b$ turn precisely through the angle α of a pole pitch, that is to say 360°/p, over their axial length l. On account of the pole number of p=8, an angle of α=45° results here for each conductor branch.

Figure 4:
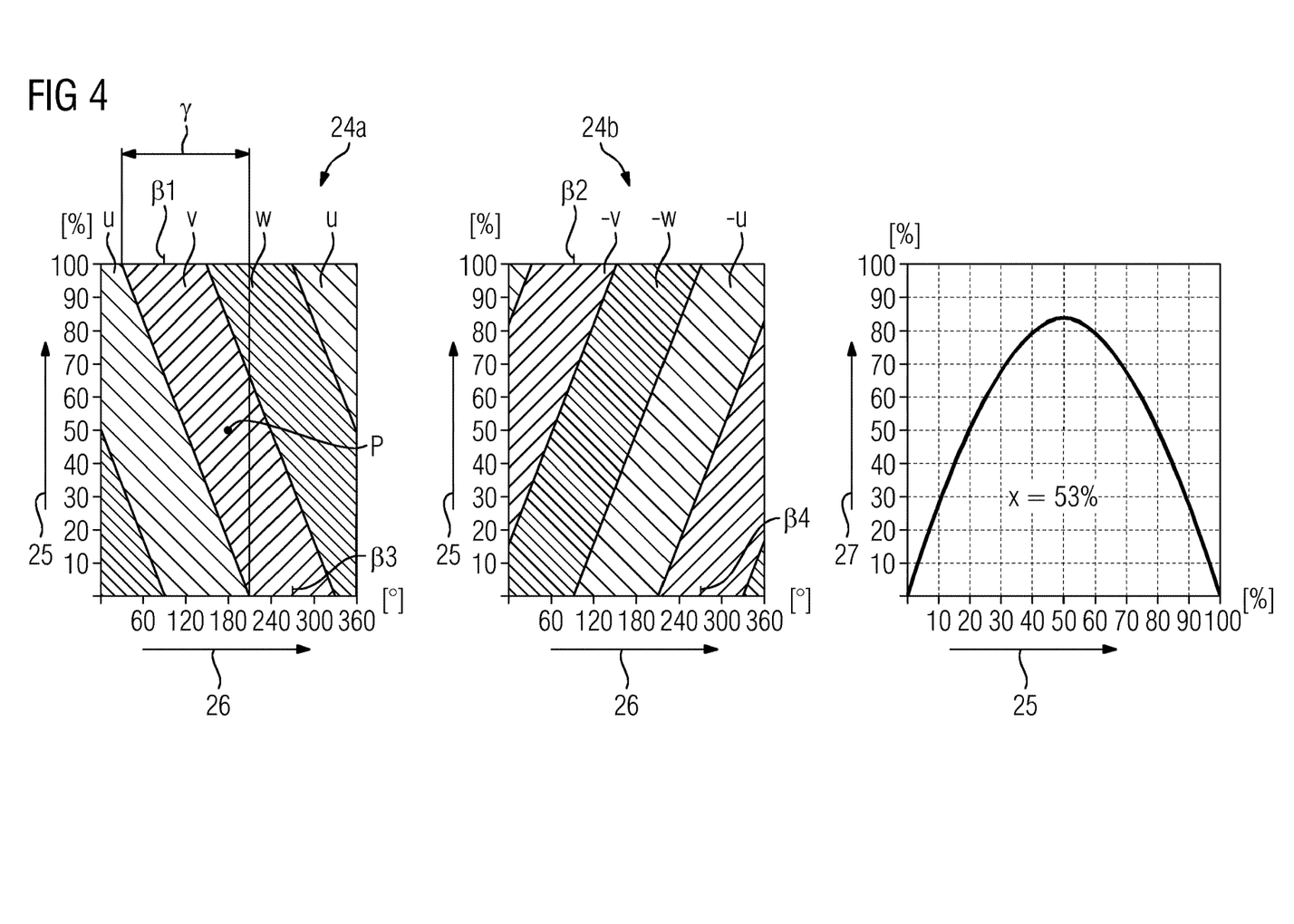
FIG. 4 shows the winding diagram and the associated field utilization of the stator winding in FIG. 2.

FIG. 4 shows the winding diagram and the associated field utilization of the stator winding 4 in FIGS. 2 and 3. The winding diagram is divided into a partial diagram 24$a$ for the lower layer 4$a$ and a partial diagram 24$b$ for the upper layer 4$b$ of the winding. The winding diagram 24$a$ therefore illustrates the geometrical arrangement of the first conductor branches 23$a$ on the inner cylinder jacket and the winding diagram 24$b$ illustrates the arrangement of the second conductor branches 23$b$ on the outer cylinder jacket. Both winding diagrams 24$a$ and 24$b$ show the arrangements of the conductor branches, which are beside one another, in the coil arrangements of the respective strands u, v and w on the basis of the axial length 25 and the electrical angle 26.

In this case, the electrical angle is the product of the geometrical angle and the number of pole pairs. In other words, in the case of a two-pole machine, the electrical angle is identical to the geometrical turning angle with respect to the winding axis A. In contrast, in the case of machines having a greater number of poles, an electrical angle of 360° is achieved if a geometrical angle corresponding to the angular distance between two adjacent identical magnetic poles (for example north pole—north pole) has been passed through. The winding diagram 24$a$ in FIG. 4 therefore accordingly shows the geometrical run of the conductor branches of the three strands u, v and w over the entire axial length l and over an axial range between two magnetic north poles. In the case of the eight-pole stator winding (four pole pairs, p=8) shown in FIG. 2, the electrical angular range of 0° to 360° which is shown corresponds to a geometrical angular range of 0° to 90°, that is to say a quarter of the full winding periphery. The entire geometrical winding run then accordingly results by stringing together the winding diagram 24a shown for the lower layer and the winding diagram 24b shown for the upper layer four times.

It is also clear from the two winding diagrams 24a and 24b that—as is already apparent from FIGS. 2 and 3—the conductor branches of a respective strand which are to be connected at the axial ends abut one another without an offset at the same peripheral positions. In this case, the electrical tilt angle γ results from the relationship γ=α*p/2, that is to say γ=180° here, as can also be seen for the layer 24a in the left-hand lower part of FIG. 4. On account of the relationship h=360°/α*1, a geometrical pitch h of 8*l, that is to say precisely the pole number p times the axial length l, results with said tilt angles of γ=180° (electrical) and α=45° (geometrical). As a result of this precisely adapted tilt, the center points of the strands u, v, w in the lower layer 24a and of the respective associated strands −u, −v, −w with the opposite direction of current flow in the upper layer 24b are at precisely the same electrical angles in the axial end regions. For the strand v (or −v), this is the angle β1=β2=90° in the axial end region (100%) illustrated at the top and is the angle β3=β4=270° in the axial end region (0%) illustrated at the bottom.

The field utilization 27 of this stator winding is shown as a function of the axial position 25 (again as a percentage of the total length l) in the right-hand part of FIG. 4. This field utilization should be understood as relative field utilization of the excitation field active in the region of the stator winding, to be precise in relation to the field utilization of a comparable electric machine having a straight winding and a number of holes of 1 (that is to say in the case of one slot for each pole number and strand). Numerically, the mean value of the winding factor of the fundamental wave was respectively determined over the axial length for this purpose. It can be easily seen that the field utilization is above 80% of the comparison value only in the central range of the axial length. In contrast, a steep drop toward 0% can be seen in the axial end regions. The drop to 0% is a fundamental drawback of this helical winding which is not according to the invention and does not have a peripheral offset between the associated conductor branches in the axial end regions. The average (that is to say averaged over the axial length l) field utilization x is accordingly only 53%. The electrical phase shift between the individual strands u, v and w is 120° in each case here.

Figure 5:
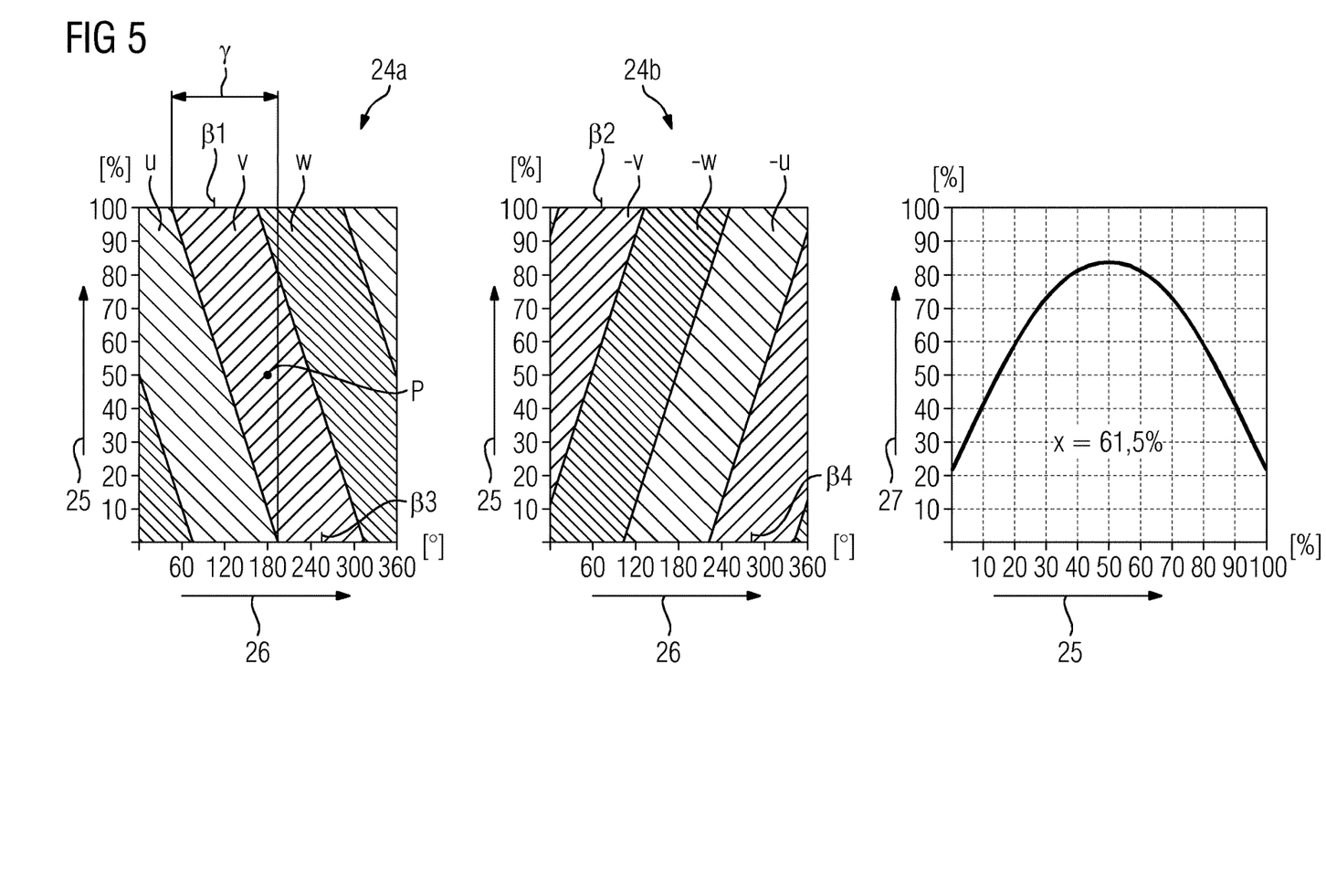
FIG. 5 shows the winding diagram and the associated field utilization of a stator winding incorporating teachings of the present disclosure.

For comparison, FIG. 5 shows the corresponding winding diagrams 24a and 24b and the field utilization for a helical stator winding incorporating teachings of the present disclosure. With respect to the number of strands n=3, the helical arrangement of the conductor branches and the division between an upper layer and a lower layer, this stator winding has a similar structure to the stator winding in the embodiment described above. However, the tilt of the individual conductor branches on the two cylinder surfaces is decreased here, thus resulting in a higher pitch and accordingly an azimuthal offset in the axial end regions between the conductor branches of a superordinate coil arrangement which are to be connected. In the embodiment shown in FIG. 5, the tilt of the conductor branches which are guided in a parallel manner in the respective layer is selected in such a manner that the individual conductor branches turn, over their axial length, through an electrical angle γ of 150°. This corresponds to a turn through a geometrical angle of α=γ/(p/2). A geometrical angle of α=37.5° therefore results with the present pole number p=8.

In comparison with the geometrical turning angle of α=45° in FIGS. 2-4, this is a decrease in the geometrical tilt angle by 7.5°. On account of the relationship h=360°/α*1, a geometrical pitch h of 9.6*l results with said tilt angles of γ=150° (electrical) and α=37.5° (geometrical). This pitch is therefore greater than the product of the axial length l and the pole number p, where p=8 here.

The decreased tilt (in comparison with the stator winding in FIGS. 2 to 4) results in an offset between the conductor ends to be connected in the axial end regions in the exemplary embodiment in FIG. 5. In the example in FIG. 5, the conductor branches are distributed over the two cylinder surfaces inside one another in such a manner that the corresponding offset is selected to be the same in the two axial end regions.

In some embodiments, the offset is not symmetrical, that is to say to be greater in one axial end region than on the opposite side. In the symmetrical embodiment in FIG. 5, an offset at the electrical angle of 30° results in both axial end regions. This offset results, for example, from the difference between the average angular position β1 of the strand v in the lower layer 24a and the average angular position β2 of the corresponding strand −v in the upper layer 24b, to be precise at the axial end (100%) illustrated at the top in each case. Since the center point P of the strand v is at the electrical coordinates of 180°, 50% for the electrical angle and axial length and the center point of the strand −v in the upper layer 24b is at the electrical coordinates of 360°, 50% for the electrical angle and axial length, a value for β1 of 180°−37.5°*2=105° and a value for β2 of 0°+37.5° *2=75° result together with the geometrical tilt angle of γ=37.5°.

The difference, that is to say the electrical angular offset between the center points of the conductors to be connected in the strands v and −v, is therefore β1−β2=30°. In a similar manner, an electrical angle for the center point of the conductor elements of v of β3=180°+37.5° *2=255°, an electrical angle for the center point of the conductor elements of −v of β4=360°−37.5° *2=285° and in turn an electrical angular offset of 30° result at the axial end (0%) illustrated at the bottom. At both axial ends, this corresponds to a geometrical angular offset of 30°/(p/2), that is to say 7.5° here, which must be bridged by the electrical connecting conductors.

The exemplary embodiment, in comparison with the stator winding in FIGS. 2 to 4, as can be seen in the right-hand part of FIG. 5: as a result of the decreased tilt and the angular offset in the end regions, the average field utilization is increased from 53% in FIG. 4 to 61.5% for the example in FIG. 5. This can be attributed, in particular, to an increase in the field utilization in the axial end regions which no longer drops to zero in the example in FIG. 5, but rather only to values just above 20%.

Figure 6:
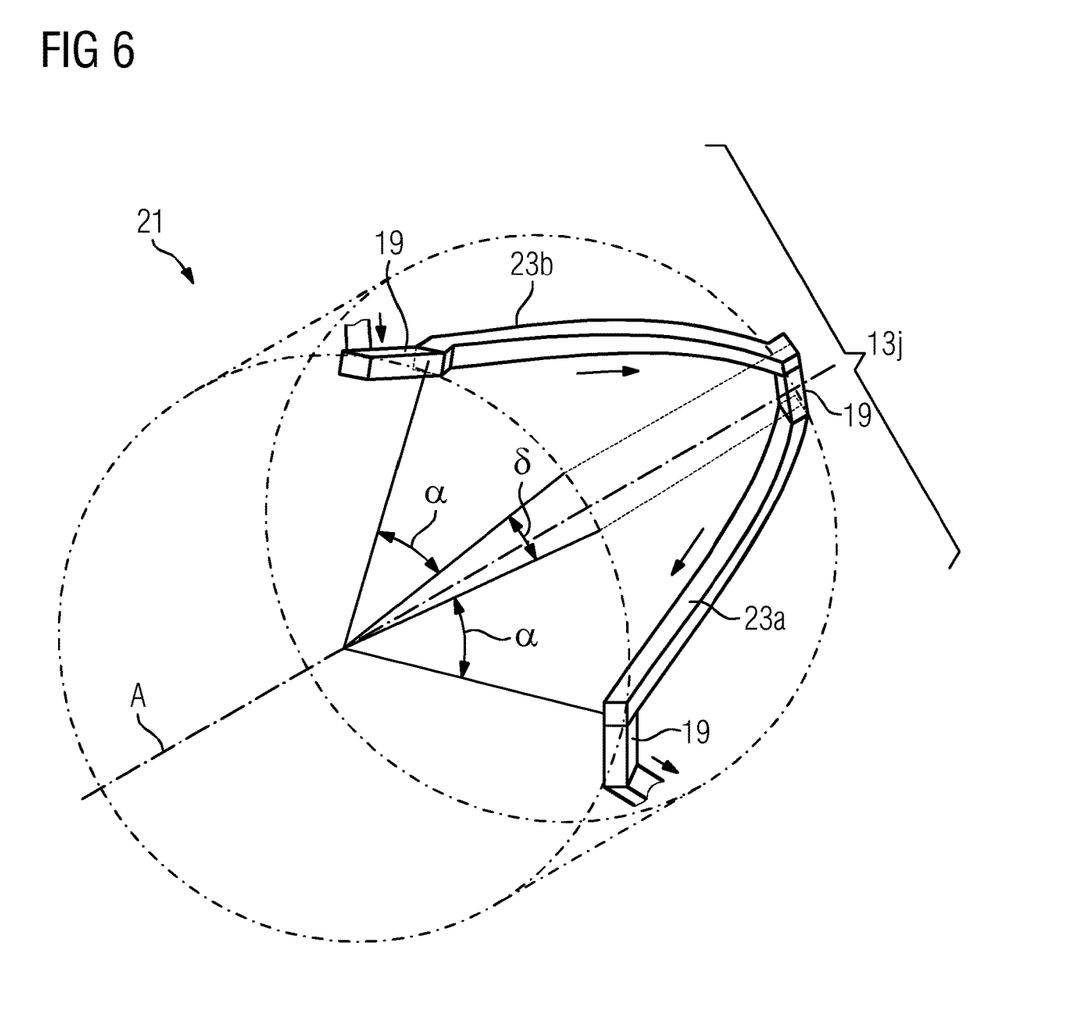
FIG. 6 shows a section of a selected strand u1 from the stator winding of the example in FIG. 5.

FIG. 6 shows, by way of example, a section of an individual coil arrangement 21 in the region of a conductor turn 13j with an outgoing conductor 23a and an incoming conductor 23b for the stator winding from the example in FIG. 5. The selected coil arrangement and the type of illustration are selected to be similar to FIG. 3, but, for the sake of clarity, only a section in the region of one conductor turn 13j is shown. As can be seen in FIG. 6, the electrical connecting conductor 19 is arranged in such a manner that it can bridge the geometrical angular offset of 5=7.5° between the conductor branches 23a and 23b to be connected. A corresponding angular offset is also bridged by the further connecting conductors which are mostly not illustrated here and connect the eight outgoing conductors and eight incoming conductors to form a superordinate coil arrangement 21.

In order to form an individual strand (for example u), four zig-zag-shaped coil arrangements 21 of this type are respectively guided beside one another, in a similar manner to that shown in FIG. 2 for the embodiment without an angular offset. It should be noted that the proportion of the angles α and δ shown in FIG. 6 is not illustrated true to scale. The figure only schematically shows the presence of an angular offset δ and is not suitable for reading absolute angles.

Figure 7:
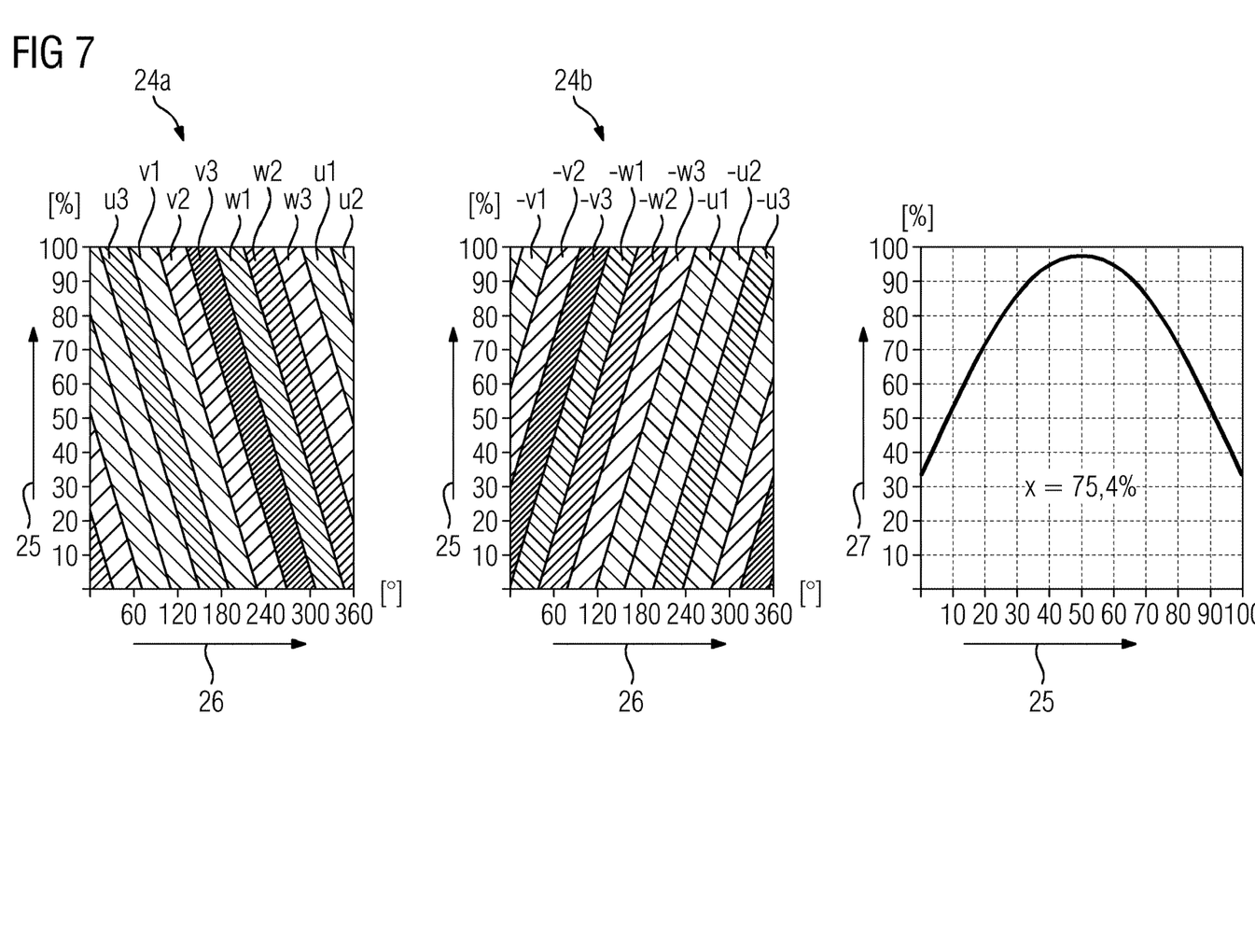
FIG. 7 shows the winding diagram and the associated field utilization of a stator winding incorporating teachings of the present disclosure.

FIG. 7 shows a further winding diagram and the associated field utilization for a further embodiment of the teachings herein. FIG. 7 shows the corresponding winding diagrams 24a and 24b of the lower and upper layers and the field utilization for a stator winding which is similar to that in FIG. 5 but has nine strands instead of only three. In comparison with the example in FIG. 5, the average field utilization is increased from 61.5% to 75.4% as a result of the increase in the number of strands. The electrical phase shift between the individual strands is 40° in each case here, with the result that the phases of the strands which are beside one another are evenly distributed overall.

A comparison of FIGS. 5 and 7 shows that the increase in the number of strands from n=3 to n=9 increases the field utilization over the entire axial length l. Both the position of the maximum in the axially inner part increases to a value of more than 97% and the field utilization in the axial end regions increases to values of more than 30%. Overall, a considerable increase in the average field utilization in comparison with the prior art results, in particular, by combining the measures described—that is to say by increasing the number of phases, on the one hand, and by the decreased tilt in combination with the offset in the peripheral direction, on the other hand. However, each of the two measures can also be used separately (and, in particular, also combined alone with other embodiments described) in order to achieve even some of the maximum possible improvement in the field utilization with an outlay on apparatus which is reduced in comparison with the combination of both measures. As an alternative to the exemplary embodiments shown with double zoning, some embodiments include a stator winding with single zoning. In some embodiments, the phase shift between the individual adjacent strands may be 360°/2n. The number of conductor branches per layer is increased by a factor of two in single zoning in comparison with double zoning. In this case, both outgoing conductors and incoming conductors of the same strand are present in each layer.

What is claimed is:

1. A stator for an AC electric machine with a number of magnetic poles, the stator comprising:
a central axis A;
a stator winding with a plurality of conductor turns;
wherein the individual conductor turns are grouped into a total of n electrical strands;
the individual conductor turns of a respective electrical strand define a first conductor branch and a second conductor branch;
the first conductor branch and the second conductor branch are arranged helically around the central axis over at least half of their respective lengths; and
the helically arranged conductor branches each have a pitch greater than a product of an axial length of the helical conductor branches and the number of magnetic poles.

2. The stator as claimed in claim 1, wherein:
the stator winding includes electrically conductive connecting conductors in axial end regions between the first conductor branches and the second conductor branches; and
the connecting conductors have both a radial direction component and a peripheral direction component.

3. The stator as claimed in claim 2, wherein the connecting conductors are arranged such that, for each strand, there is at least one superordinate coil arrangement.

4. The stator as claimed in claim 1, wherein:
the stator winding has a number i of conductor turns; and
the number i corresponds either: to a product of the pole number and of the strand number n; or to one half of a product of the pole number and of the strand number n.

5. The stator as claimed in claim 4, wherein:
each of the conductor turns has a first conductor branch and a second conductor branch;
the respective conductor branches are wound helically over their axial length l with an angle α, giving a pitch p; and
where the value of α is at least $\alpha=360°/p-2*360°/i$ and smaller than $\alpha=360°/p$.

6. The stator as claimed in claim 1, wherein:
the first conductor branches of the individual conductor turns are arranged on a common inner cylinder surface; and
the second conductor branches of the individual conductor turns are arranged on a common outer cylinder surface.

7. The stator as claimed in claim 6, wherein:
the first conductor branches on the inner cylinder surface have a common first winding direction; and
the second conductor branches on the outer cylinder surface have a common second winding direction opposite the first winding direction.

8. The stator as claimed in claim 1, wherein the number n of strands is greater than three.

9. The stator as claimed in claim 1, wherein the stator winding comprises an air gap winding.

10. An electric machine comprising:
a rotor; and
a stator having a central axis;
wherein the stator includes a stator winding with a plurality of conductor turns;
wherein individual conductor turns of the plurality of conductor turns are grouped into a total of n electrical strands;
the individual conductor turns of a respective electrical strand define a first conductor branch and a second conductor branch;
the first conductor branch and the second conductor branch are arranged helically around the central axis over at least half of their respective lengths; and
the helically arranged conductor branches each have a pitch greater than a product of an axial length of the helical conductor branches and the number of magnetic poles.

11. The electric machine as claimed in claim 10, wherein the rotor generate a magnetic field with p poles.

12. The electric machine as claimed in claim 11, wherein the rotor comprises a superconductive excitation winding.

13. The electric machine as claimed in claim 10, further comprising an inverter for creating or removing a phase shift between currents flowing in individual strands of the stator winding.

14. The electric machine claimed in claim 10, wherein the number p of magnetic poles is between 2 and 12.

* * * * *